United States Patent
Kajaria et al.

(10) Patent No.: US 10,151,188 B2
(45) Date of Patent: Dec. 11, 2018

(54) SYSTEM AND METHOD OF REDUCING EROSION IN FRAC APPLICATIONS

(71) Applicant: GE Oil & Gas Pressure Control LP, Houston, TX (US)

(72) Inventors: Saurabh Kajaria, Houston, TX (US); Fauad Saleem, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 277 days.

(21) Appl. No.: 14/968,576

(22) Filed: Dec. 14, 2015

(65) Prior Publication Data

US 2016/0168970 A1   Jun. 16, 2016

Related U.S. Application Data

(60) Provisional application No. 62/092,336, filed on Dec. 16, 2014.

(51) Int. Cl.
| | |
|---|---|
| E21B 43/26 | (2006.01) |
| C09D 163/00 | (2006.01) |
| C09D 5/00 | (2006.01) |
| C09D 183/04 | (2006.01) |
| E21B 33/068 | (2006.01) |
| B05D 7/22 | (2006.01) |

(52) U.S. Cl.
CPC .............. *E21B 43/26* (2013.01); *B05D 7/225* (2013.01); *C09D 5/002* (2013.01); *C09D 163/00* (2013.01); *C09D 183/04* (2013.01); *E21B 33/068* (2013.01)

(58) Field of Classification Search
CPC ......... E21B 43/26; E21B 33/068; B05D 1/02; B05D 7/225
See application file for complete search history.

(56) References Cited

U.S. PATENT DOCUMENTS

| | | | |
|---|---|---|---|
| 6,144,106 A | 11/2000 | Bearinger et al. | |
| 8,950,485 B2 | 2/2015 | Wilkins | |
| 9,127,545 B2 | 9/2015 | Kajaria | |
| 2005/0019589 A1* | 1/2005 | Wiedemann | B05D 5/02 428/450 |
| 2008/0083530 A1 | 4/2008 | Boyd | |
| 2011/0158807 A1 | 6/2011 | Hong | |
| 2014/0020901 A1 | 1/2014 | Kajaria | |
| 2015/0292297 A1 | 10/2015 | Kajaria | |

FOREIGN PATENT DOCUMENTS

| | | |
|---|---|---|
| CN | 203066924 U | 7/2013 |
| GB | 951231 A | 3/1964 |

OTHER PUBLICATIONS

International Search Report and Written Opinion issued in connection with corresponding PCT Application No. PCT/US2015/065951, dated Mar. 15, 2016.

* cited by examiner

*Primary Examiner* — David J Bagnell
*Assistant Examiner* — Manuel C Portocarrero
(74) *Attorney, Agent, or Firm* — Hogan Lovells US LLP

(57) ABSTRACT

A well fracturing component has a steel body with at least one passage and a connector for connecting the body to a source of pressurized frac fluid containing particulates for injecting into a well. An epoxy-based primer layer bonds to a side wall of the passage. A siloxane topcoat layer bonds to the primer layer. The topcoat layer has a greater thickness than the primer layer. The topcoat layer has less hardness than the primer layer and loss hardness than the body.

20 Claims, 3 Drawing Sheets

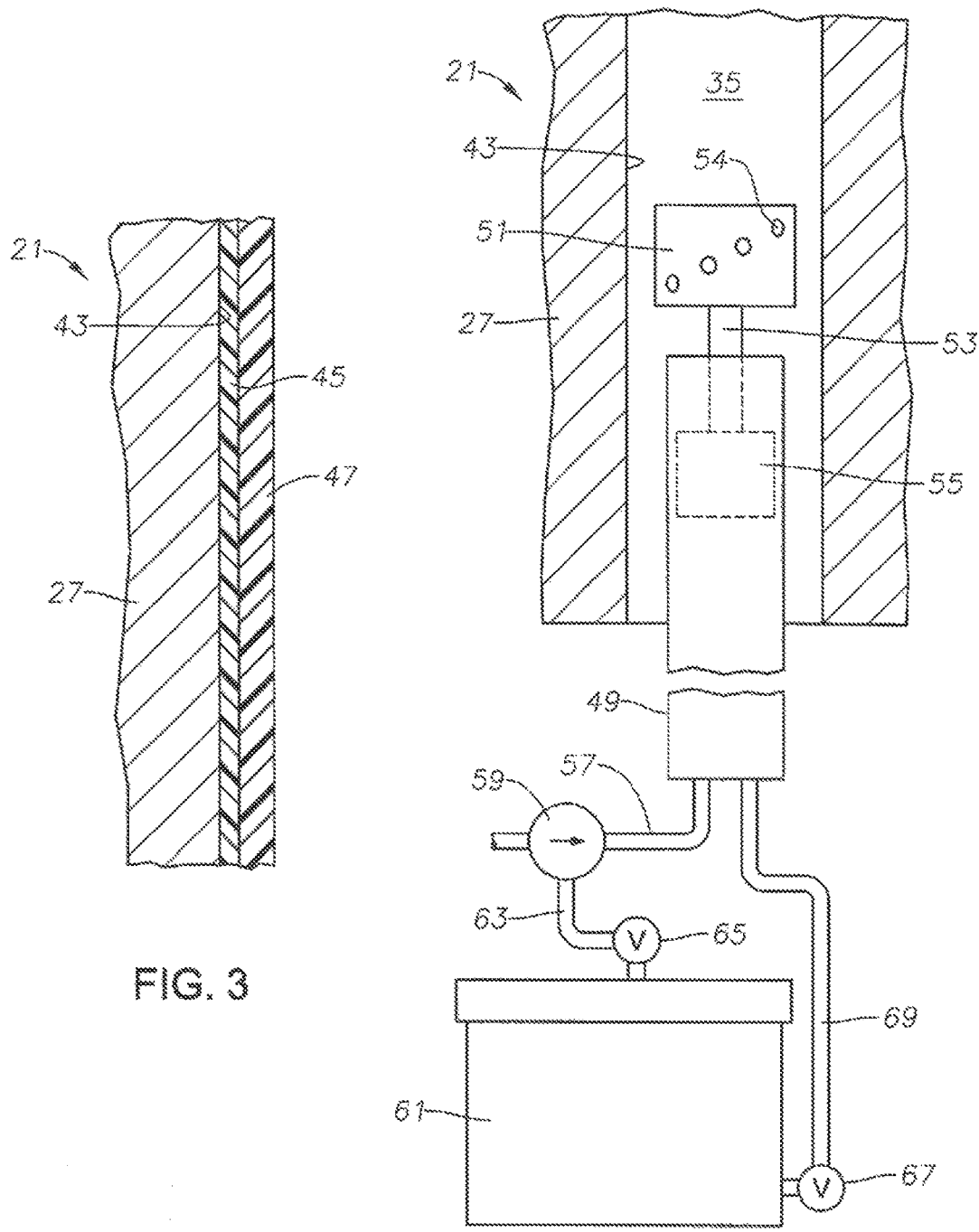

SYSTEM AND METHOD OF REDUCING EROSION IN FRAC APPLICATIONS

CROSS REFERENCE TO RELATED APPLICATION

This application claims priority to provisional application 62/092,336, filed Dec. 16, 2014.

FIELD OF THE DISCLOSURE

This disclosure relates to preventing and treating erosion prone surfaces of components associated with hydraulic fracturing operations for producing hydrocarbons from subterranean wells.

BACKGROUND

Many hydrocarbon producing wells are hydraulically fracked or fractured. During a fracking process, an operator blends particulates such as sand with water and other liquids. The operator feeds the sand-laden slurry to high pressure pumps. The high pressure pumps pump the slurry through frac tree assemblies into one or more wells.

Equipment used in hydraulic fracturing applications associated with hydrocarbon production wells experience high erosion rates relative to other equipment that is used for the production of fluids from the wells. As a result of such erosion, hydraulic fracturing equipment needs to be serviced more often, which can result in a shorter mean time between repair and replacement services required for the hydraulic fracturing equipment than the mean time between repair and replacement services for oilier equipment that is used for me production of fluids from the wells.

In order to meet the demand of high pressure hydraulic fracturing operations, hydraulic fracturing equipment is formed of high strength materials, for example metals or metal reinforced materials. Although such materials are strong and can be very hard, they do not reflect the high energy of slurry panicles that are constantly impinging on the wear surfaces of such equipment, but instead are subjected to the entire force of the collision or impact of such particles on the wear surfaces.

SUMMARY

A well fracturing apparatus has a body having at least one passage and a connector for connecting to a source of pressurized frac fluid containing particulates for injecting into a well. An epoxy primer layer bonds to a side wall of the passage. A polymer topcoat layer bonds to the primer layer.

The topcoat layer has a greater thickness than the primer layer. The primer layer may have a thickness in a range from 0.001 to 0.005 inch. The topcoat layer may have a thickness in a range from 0.005 to 0.050 inch.

The topcoat layer has less hardness than the primer layer. The body of the component may be formed of a steel. The topcoat layer has less hardness than the body.

Preferably, the topcoat comprises siloxane. More specifically, the topcoat comprises a nano-composite siloxane-based (Si—O—Si) material.

The body of the component has a plurality of the passages. The primer layer and the topcoat layer are preferably bonded to side walls in all of the passages.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

FIG. 3 is an enlarged sectional view of one of the passages of the multi-inlet hub of FIG. 2, showing the coating layers.

FIG. 4 is a schematic and partially sectional view of one of the passages of the hub of FIG. 2, also showing equipment for applying the coatings to the passage.

DETAILED DESCRIPTION OF THE DISCLOSURE

Figure 1:
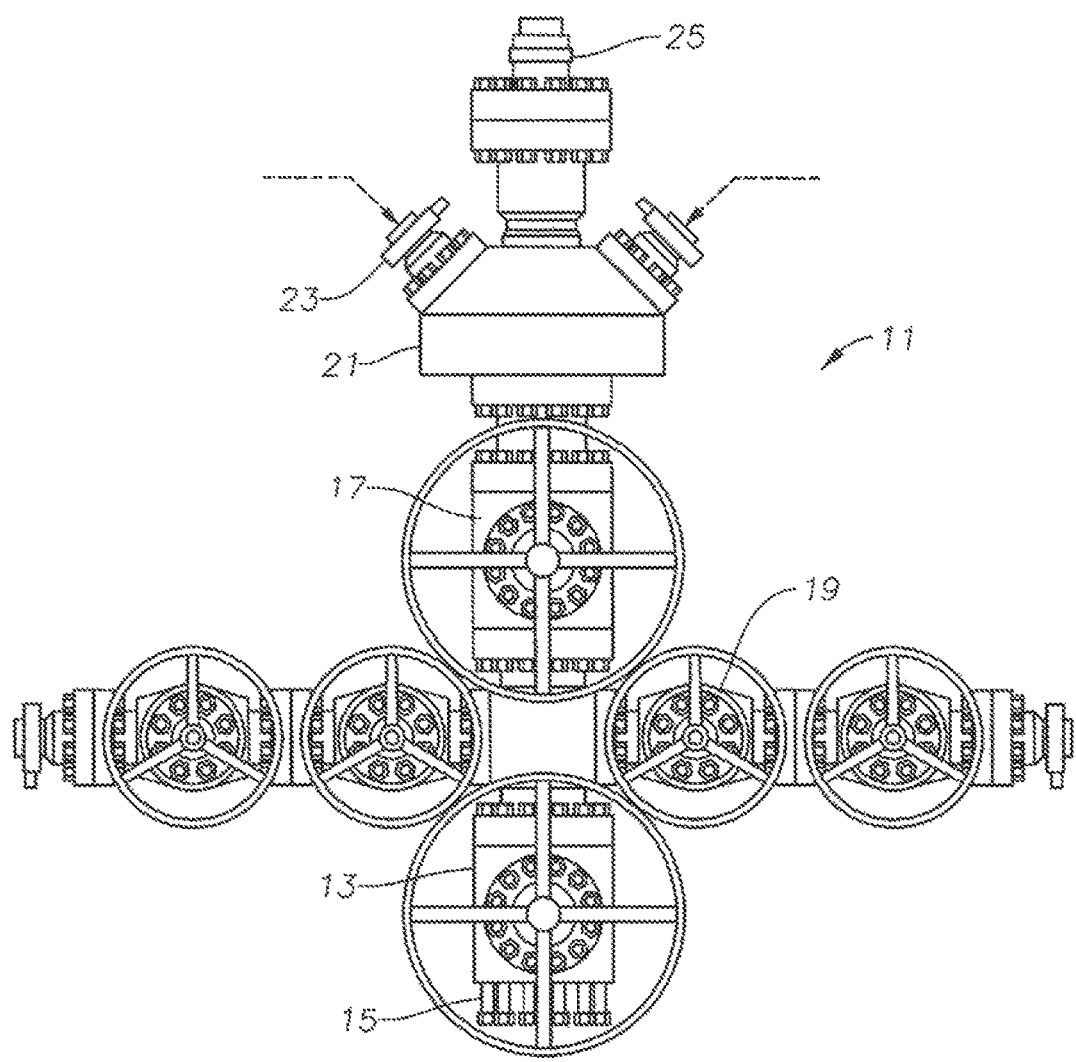
FIG. 1 is a front view of a frac tree assembly having components in accordance with an embodiment of this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, hydraulic well fracturing operations often employ a frac five assembly 11. Frac tree assembly 11 has a number of valves, including a lower main valve 13 having bolts for securing frac tree assembly 11 vertically in line to wellhead components (not shown) of a well to be fracked. Frac tree assembly 11 may also have an upper main valve 17 and a number of wing valves 19 extending laterally outward from a junction between lower and upper main valves 13, 17.

If frac tree assembly 11 is to receive frac fluid from several pump trunks, it may have a multi-inlet hub 21 above upper main valve 17. Multi-inlet hub 21 has a number of connectors 23 for connecting flow lines from high pressure pumps (not shown) to frac tree assembly 11. A tree cap 25 may be mounted to an upper end of multi-inlet hub 21. During operation, high pressure pump trucks pump a frac fluid info at least one of the connectors 23, as indicated by the dashed lines. The frac fluid may by pumped at flow velocities up to 50 feet/sec and pressures as high as 15,000 psi. If a frac manifold (not shown) is employed to simultaneously frack more than one well, multi-inlet hubs 21 may be mounted to the manifolds, as well.

Figure 2:
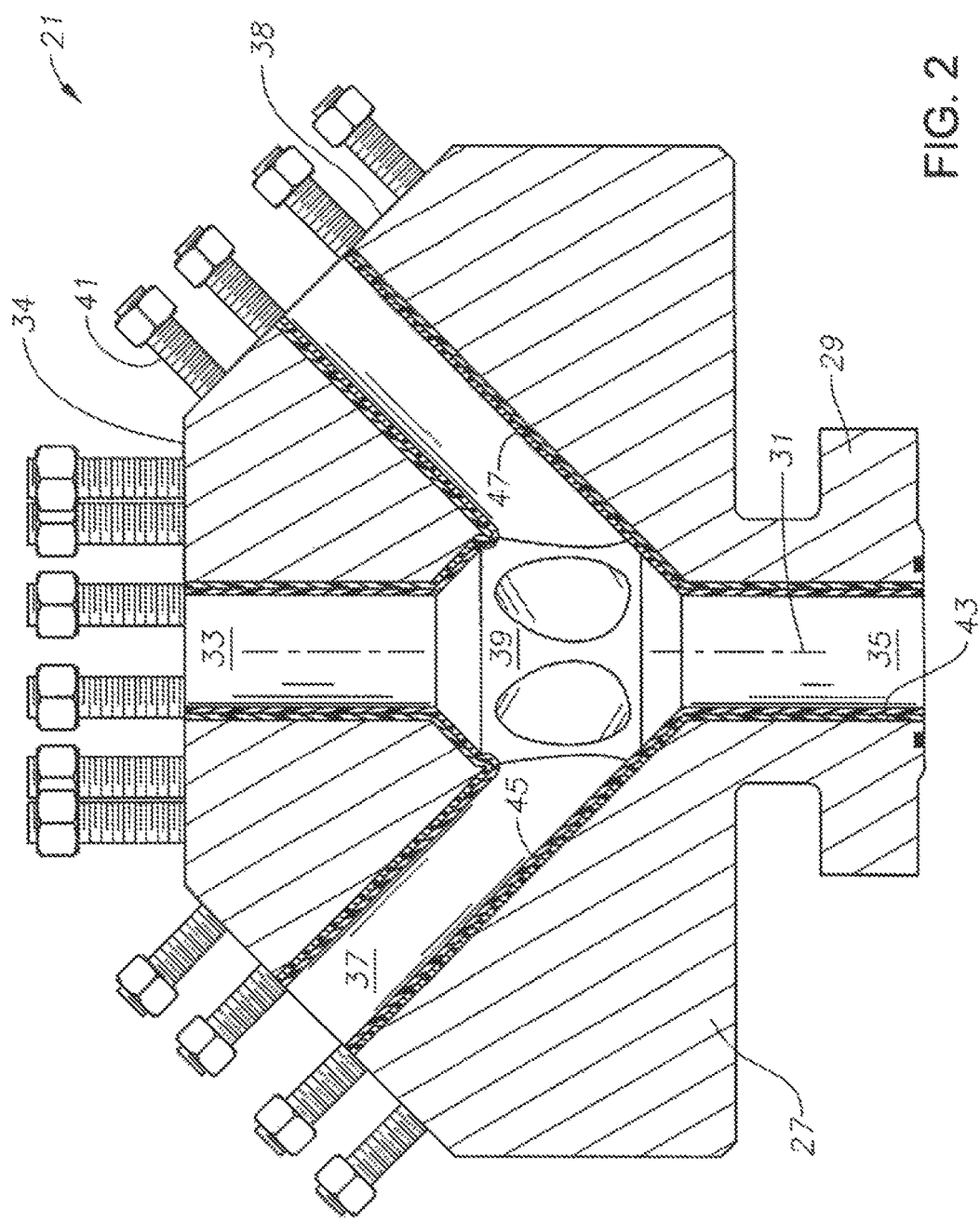
FIG. 2 is an enlarged sectional view of a multi-inlet hub, one of the components of the frac tree assembly of FIG. 1, the hub having passages coated in accordance with an embodiment of this disclosure.

Referring to FIG. 2, multi-inlet hub 21 has a steel alloy body 27. A flange 29 on the lower end of body 27 serves to mount body 21 to upper main valve 17, typically by bolts (not shown) passing through holes (not shown) in flange 29. Body 27 has a longitudinal axis 31 that will normally be vertical while multi-inlet hub 21 is in operation.

Multi-inlet hub 21 has a number of passages within it, including an axial inlet passage 33 extending downward from an upper end 34. Upper end 34 is flat and perpendicular to axis 31. Axial inlet passage 33 joins an axial outlet passage 35 extending downward through flange 29. Several lateral inlet passages 37 extend downward and inward at angle inclined relative to axis 31 from connector faces 38. Connector faces 38 may also be flat, but are in inclined planes intersecting axis 31 at acute angles. Lateral inlet passages 37 extend to and intersect each other an enlarged chamber 39 that is coaxial with and joins axial inlet passage 33 with axial outlet passage 35. The full lengths of two of the lateral inlet passage 37 are shown in the sectional plane and two others are illustrated by elliptical holes in chamber 39 where they join chamber 39. Chamber 39 is also a passage through which frac fluid will be pumped as the fluid flows to outlet 35. Bolts 41 extend from upper end 34 and connector faces 38 for connecting to other components, such as tree cap 25 and connectors 23 (FIG. 1).

At least some and preferably all of the passages 33, 35, 37 and 39 that will be exposed to frac fluid being pumped into the well have erosion protection. The erosion protection comprises coatings bonded to side walls 43 of the various passages. The coatings include a primer layer 45, which is a two-part epoxy resin with one part being the catalyst. Primer layer 45 is selected to be an adhesion promoter. The coatings also include a topcoat layer 47 applied to primer layer 45 after primer layer 45 has cured. Topcoat layer is a polymer, more particularly an elastomer; the preferred material is a siloxane-based (Si—O—Si) nano-composite sprayable formulation.

As schematically illustrated in FIG. 3, the thickness of primer layer 45 is preferably considerably loss man the thickness of topcoat layer 47. In one embodiment, primer layer 45 is about 0.001 to 0.005 inch. Topcoat layer 47 is about 0.005 to 0.050 inch in thickness. The hardness of both primer layer 45 and topcoat layer 47 is much less than the hardness of the steel body 27, measured at side walls 43. Topcoat layer 47 has a flexible resilience that allows topcoat layer 47 to absorb and dissipate the impact energy of high speed sand or slurry frac fluid.

FIG. 4 illustrates one method of applying primer layer 45 and topcoat layer 47 to passage side walls 43. The method employs a spray coating device 49, which has a spray head 51 that inserts into the various passages, such as outlet passage 35. Spray head 51 mounts to a tube 53 that extends from a wand. Tube 53 delivers the chemicals for layers 45, 47 to orifices 54 in the side wall of spray head 51. An air motor 55 or other drive device spins spray head 51 relative to the wand at a high velocity, which disperses the chemicals of layers 45, 47 laterally outward. An air hose 57 supplies air pressure from an air compressor 59. In this example, the air under pressure is not mixed with the liquid being dispensed; rather it is used only to rotate spray head 51.

A pressure lank 61 contains the liquids that make up primer layer 45 and topcoat layer 47. A separate pressure tank 61 for the chemicals for primary layer 45 may be used from the pressure tank 61 for topcoat layer 47. Pressure may be applied to the liquid within pressure lank 61 by an air hose 63 leading from air compressor 59 through a valve 65.

The liquid in pressure tank 61 to be dispensed flows through a valve 67 and flexible flow line 69 to spray head tube 53.

In the coating process, first a technician will clean and apply a slightly roughened texture to side walls 43 with 120 grit abrasives. This step may be done by blasting, emery cloth or other methods. The technician pours mixed parts A and B of the liquid epoxy of primer layer 45 into pressure tank 61. The technician will then insert spray head 51 into passage 35, apply air pressure to cause spray head 51 to spin, then open valve 67 to flow the liquid of primer layer 45 from pressure tank 61 to spray head 51. The liquid of primer layer 45 disperses out orifices 54 on side walls 43. Primer layer 45 cures at room temperature in about 24 hours.

Alter primer layer 45 cures, the technician repeats the process for the liquid of topcoat layer 47. The technician may apply topcoat layer 47 several limes to reach the desired thickness. Topcoat layer 47 also cures at room temperature.

In addition to multi-inlet hub 21, the erosion resistant coatings described can be applied to high pressure frac slurry passages of other equipment brought to a well site specifically for tracking operations. Other equipment could include at least the following: straight bore passages of frac tree assemblies; flow lines leading from the high pressure pump trucks to frac tree assembly 11; passages within upper and lower main valves 17, 13, blowout preventers, and isolation sleeves that insert into the wellhead.

The coatings can be used to limit erosion and associated wear, and can prolong the useful life of the hydraulic fracturing equipment. In embodiments of this disclosure, the main body of the hydraulic fracturing equipment will continue to provide the strength and hardness required to meet the demands of high pressure hydraulic fracturing operations. The elastomer coating applied to the passages of the hydraulic fracturing equipment will provide a spring effect to bounce the particles of sand and slurry away from the wear surfaces and deflect or reflect the high energy of the panicles that are directed at such wear surfaces. The elastomer coating has properties that allow the coating to absorb and dissipate the impact energy of high speed sand or slurry with sufficient toughness to resist tearing or de-bonding of the coating. The flexibility and mechanical properties of the elastomer coating allows the coating to effectively reduce or prevent sand erosion, corrosion, cavitation, and weathering of the wear surface to which it is applied. The elastomer coating can be applied to wear surfaces that have already been eroded in order to repair the washed out surfaces. The elastomer coating can alternately be used to coat surfaces of new equipment to prevent or reduce erosion to such surfaces when the equipment is put in service.

While the disclosure has been shown in only one of its forms, it should be apparent to those skilled in the art that various changes may be made.

The invention claimed is:

1. A well fracturing apparatus, comprising:
   a body having at least one passage and a connector for connecting to a source of pressurized frac fluid containing particulates for injecting into a well;
   an epoxy primer layer bonded to a side wall of the passage; and
   a topcoat layer bonded to the primer layer, the topcoat layer comprising a polymer having a flexible resilience to absorb and dissipate the impact energy from the particulates.

2. The apparatus according to claim 1, wherein: the topcoat layer has a greater thickness than the primer layer.

3. The apparatus according to claim 1, wherein: the primer layer has a thickness in a range from 0.001 to 0.005 inch.

4. The apparatus according to claim 1, wherein: the topcoat layer has a thickness in a range from 0.005 to 0.050 inch.

5. The apparatus according to claim 1, wherein: the topcoat layer has less hardness than the primer layer.

6. The apparatus according to claim 1, wherein: the body is formed of a steel; and the topcoat layer has less hardness than the body.

7. The apparatus according to claim 1, wherein: the topcoat comprises siloxane.

8. The apparatus according to claim 1, wherein: the topcoat comprises a nano-composite siloxane-based (Si—O—Si) material.

9. The apparatus according to claim 1, wherein:
the body has a plurality of the passages that intersect each other; and
the primer layer and the topcoat layer are bonded to side walls of at least some of the passages that intersect each other.

10. A well fracturing apparatus, comprising:
a steel body having at least one passage and a connector for connecting the body to a source of pressurized frac fluid containing particulates for injecting into a well;
an epoxy-based primer layer bonded to a side wall of the passage; and
a topcoat layer bonded to the primer layer, the topcoat layer comprising siloxane having a flexible resilience to absorb and dissipate the impact energy from the particulates.

11. The apparatus according to claim 10, wherein; the topcoat layer has a greater thickness than the primer layer.

12. The apparatus according to claim 11, wherein the body comprises: a multi-inlet hub; and said at least one of the passages comprising an outlet and a plurality of inlets that intersect the outlet.

13. The apparatus according to claim 10, wherein: the primer layer has a thickness in a range from 0.001 to 0.005 inch.

14. The apparatus according to claim 10, wherein: the topcoat layer has a thickness in a range from 0.005 to 0.050 inch.

15. The apparatus according to claim 10, wherein: the topcoat layer has less hardness than the primer layer and less hardness than the body.

16. The apparatus according to claim 10, wherein:
the body has a plurality of the passages that intersect each other; and
the primer layer and the topcoat layer are bonded to side walls of at least some of the passages that intersect each other.

17. A method for reducing erosion in a passage of a well frac component due to particulate laden frac fluid being pumped through the passage, the method comprising:
positioning a spray coating device within the passage, the spray coating device including a spray head that rotates about an axis;
spraying an epoxy primer to a side wall of the passage via the spray head such that the epoxy primer is dispersed laterally outward from the spray head and allowing the epoxy primer to cure to form a primer layer; then
spraying a polymer via the spray head onto the primer layer and allowing the polymer to cure to form a topcoat layer.

18. The method according to claim 17, wherein: spraying the polymer onto the primer layer comprises providing the topcoat layer with a greater thickness man the primer layer.

19. The method according to claim 17, wherein: selecting the epoxy primer and the polymer such that the topcoat layer has a lesser hardness than the primer layer and less than the side wall of the component.

20. The method according to claim 17, wherein: the component is formed of a steel; and the polymer of the topcoat layer comprises siloxane.

* * * * *